United States Patent
Kim et al.

(10) Patent No.: US 9,344,153 B2
(45) Date of Patent: May 17, 2016

(54) READER RECEIVERS AND READER TRANSCEIVERS INCLUDING THE SAME

(71) Applicant: Samsung Electronics Co., Ltd., Suwon-si (KR)

(72) Inventors: Jun-Ho Kim, Seongnam-si (KR); Il-Jong Song, Suwon-si (KR); Hang-Seok Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/546,311

(22) Filed: Nov. 18, 2014

(65) Prior Publication Data

US 2015/0146818 A1 May 28, 2015

(30) Foreign Application Priority Data

Nov. 25, 2013 (KR) .................. 10-2013-0143403

(51) Int. Cl.
*H04L 27/00* (2006.01)
*H04B 5/00* (2006.01)

(52) U.S. Cl.
CPC .............. *H04B 5/0031* (2013.01); *H04L 27/00* (2013.01)

(58) Field of Classification Search
CPC ... H04L 1/0003; H04L 1/0071; H04L 5/0007; H04L 1/0009; H04L 27/0008; H04L 27/00; H04B 5/0031
See application file for complete search history.

(56) References Cited

U.S. PATENT DOCUMENTS

| | | | |
|---|---|---|---|
| 5,937,335 A * | 8/1999 | Park | H04B 1/405 455/112 |
| 7,089,794 B2 | 8/2006 | Kalinin et al. | |
| 7,702,047 B2 | 4/2010 | Kwon et al. | |
| 7,825,773 B2 | 11/2010 | Koo et al. | |
| 7,835,716 B2 | 11/2010 | Kwon et al. | |
| 2006/0252398 A1 | 11/2006 | Park et al. | |
| 2007/0206704 A1 | 9/2007 | Zhou et al. | |
| 2008/0198903 A1 | 8/2008 | Kawai | |
| 2009/0141774 A1* | 6/2009 | Araki | H03L 7/0801 375/130 |
| 2010/0112943 A1* | 5/2010 | Chia | H01Q 1/2216 455/41.2 |
| 2012/0146702 A1 | 6/2012 | Booth | |
| 2012/0235856 A1 | 9/2012 | Nogami et al. | |
| 2013/0077418 A1* | 3/2013 | Aoki | H03L 7/087 365/194 |

FOREIGN PATENT DOCUMENTS

| | | |
|---|---|---|
| KR | 1020080040813 | 5/2008 |
| KR | 1020080112669 | 12/2008 |
| KR | 1020120100135 | 9/2012 |

* cited by examiner

*Primary Examiner* — Ted Wang
(74) *Attorney, Agent, or Firm* — Myers Bigel & Sibley, P.A.

(57) ABSTRACT

Reader receivers including a sample clock providing unit are provided. The sample clock providing unit may be configured to generate a plurality of first clock signals of equivalent frequency that are out-of-phase relative to each other and further configured to generate first and second sample clock signals of unequal phase from selected ones of the plurality of first clock signals by comparing a respective phase of each of the plurality of first clock signals against a phase of a reference clock signal.

16 Claims, 9 Drawing Sheets

READER RECEIVERS AND READER TRANSCEIVERS INCLUDING THE SAME

CROSS-REFERENCE TO RELATED APPLICATION

This U.S. non-provisional application claims priority under 35 U.S.C. §119 to Korean Patent Applications No. 10-2013-0143403, filed on Nov. 25, 2013 in the Korean Intellectual Property Office (KIPO), the disclosure of which is hereby incorporated by reference in its entirety.

BACKGROUND

The present disclosure relates to the field of electronics and, more particularly, to reader receivers and reader transceivers for near field communication (NFC).

The near field communication technology is being widely applied to various mobile devices. For a correct data transfer through the near field communication, a phase difference between a sampling clock signal and a received signal may need to be minimized or optimized. To reduce the phase difference between the sampling clock signal and the received signal, a delay locked loop (DLL) may be used. However, a DLL may increase design complexity and device size.

SUMMARY

A reader receiver may include a sample clock providing circuit configured to generate a plurality of delayed clock signals by controlling a phase of an initial clock signal, configured to select one of the plurality of delayed clock signals as a sample clock signal based on an input signal and further configured to provide an I phase sample clock signal and a Q phase sample clock signal based on the sample clock signal. The reader receiver may also include a mixer configured to convert the input signal into base band signals in synchronization with the I phase sample clock signal and the Q phase sample clock signal, respectively and a base band signal processing circuit configured to filter and amplify the base band signals.

According to various embodiments, the sample clock providing circuit may include a reference clock generator configured to generate a reference clock signal based on the input signal, an initial clock generator configured to generate the initial clock signal, a clock delay circuit configured to generate the plurality of delayed clock signals by delaying the initial clock signal, a phase comparator configured to provide a selection signal by comparing a respective phase of each of the plurality of delayed clock signals against a phase of the reference clock signal, and a selector configured to output the I phase sample clock signal and the Q phase sample clock signal by selecting the one of the plurality of delayed clock signals as the sample clock signal based on the selection signal.

In various embodiments, the clock delay circuit may include a plurality of delay cells configured to provide the plurality of delayed clock signals by controlling the phase of the initial clock signal. An interval of controlling a phase of the sample clock signal may decrease as a number of the plurality of delayed clock signals increases.

In various embodiments, the one of the plurality of delayed clock signals selected as the sample clock signal may be most closely aligned in phase to the reference clock signal.

In various embodiments, the sample clock providing circuit may be configured to control the phase of the sample clock signal to reduce a phase noise of the sample clock signal.

According to various embodiments, the phase comparator may include a phase comparing circuit configured to output phase difference signals by comparing the respective phase of each of the plurality of delayed clock signals against the phase of the reference clock signal, and a ranking generator configured to determine phase difference rankings of the phase difference signals and configured to provide the selection signal based on the phase difference rankings.

In various embodiments, phase differences between the reference clock signal and each of the plurality of delayed clock signals may be represented as pulse widths corresponding to the respective phase differences.

In various embodiments, the phase comparing circuit may be configured to output the phase difference signals by converting the pulse widths to amplitudes of voltages or currents.

According to various embodiments, each of the phase difference rankings may be digital code provided based on the amplitudes of the voltages or the currents.

According to various embodiments, the ranking generator may be configured to arrange the digital codes in a descending order or an ascending order.

In various embodiments, values of the phase difference signals may decrease as values of the digital codes increase when the digital codes are arranged in the descending order, and a first digital code of the arranged digital codes may be provided as the selection signal.

In various embodiments, values of the phase difference signals may increase as values of the digital codes increase when the digital codes are arranged in the ascending order, and a last digital code of the arranged digital codes may be provided as the selection signal.

A reader transceiver may include a reader transmitter configured to transmit an output signal in synchronization with a transmission clock signal and a reader receiver configured to process an input signal. The reader receiver may include a sample clock providing circuit configured to generate a plurality of delayed clock signals by controlling a phase of an initial clock signal, configured to select one of the plurality of delayed clock signals as a sample clock signal based on an input signal and further configured to provide an I phase sample clock signal and a Q phase sample clock signal based on the sample clock signal. The reader receiver may also include a mixer configured to convert the input signal into base band signals in synchronization with the I phase sample clock signal and the Q phase sample clock signal, respectively and a base band signal processing circuit configured to filter and amplify the base band signals.

In various embodiments, the I phase sample clock signal and the Q phase sample clock signal may be provided by controlling a phase of the transmission clock signal.

According to various embodiments, the reader transceiver may further include a phase trace circuit configured to perform a tracing process for the I phase sample clock signal and the Q phase sample clock signal between an end of a reader transmission interval and a start of a reader reception interval.

A near field communication (NFC) receiver may include a sample clock generator configured to generate a plurality of first clock signals of equivalent frequency that are out-of-phase relative to each other and further configured to generate first and second sample clock signals of unequal phase from selected ones of the plurality of first clock signals by comparing a respective phase of each of the plurality of first clock signals against a phase of a reference clock signal recovered from an input signal. The NFC receiver may also include a mixer configured to convert the input signal into a pair of base band signals that are synchronized with the first and second sample clock signals.

According to various embodiments, the NFC receiver may further include a base band signal processor configured to filter and amplify the pair of base band signals.

In various embodiments, comparing a respective phase of each of the plurality of first clock signals against a phase of a reference clock signal may include identifying which of the plurality of first clock signals is most closely aligned in phase to the reference clock signal.

In various embodiments, identifying which of the plurality of first clock signals is most closely aligned in phase to the reference clock signal may include passing the plurality of first clock signals in sequence through a phase comparing circuit and a phase ranking generator.

According to various embodiments, the phase comparing circuit may utilize a plurality of XNOR gates at a front end thereof to determine degrees of phase alignment between the reference clock signal and each of the plurality of first clock signals.

DETAILED DESCRIPTION

Figure 1:
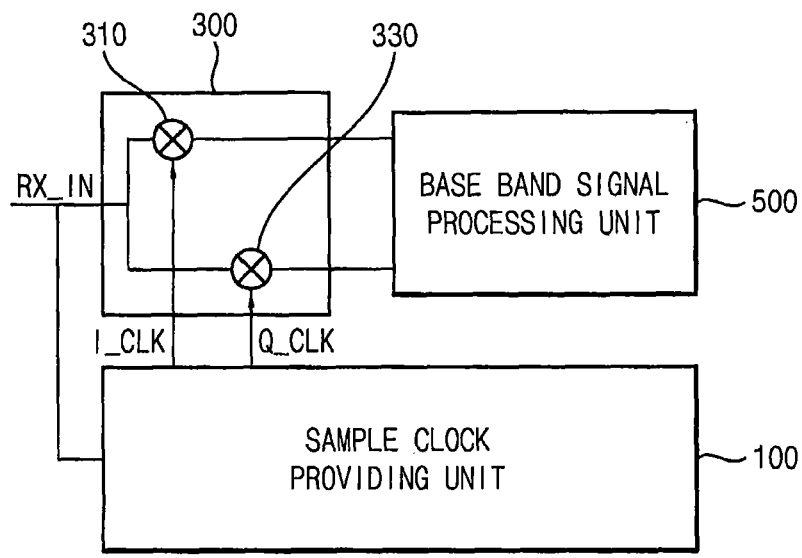
FIG. 1 is a block diagram illustrating a reader receiver according to some embodiments of the present inventive concept.

Various example embodiments will be described with reference to the accompanying drawings. The present inventive concept may, however, be embodied in many different forms and embodiments without deviating from the sprit and teaching of this disclosure, and so the disclosure should not be construed as limited to the example embodiments set forth herein. Rather, these example embodiments are provided so that this disclosure will be thorough and complete and will fully convey the scope of the present inventive concept to those skilled in the art. In the drawings, the sizes and relative sizes of layers and regions may be exaggerated for clarity. Like reference numbers refer to like elements throughout.

It will be understood that, although the terms first, second, third etc. may be used herein to describe various elements, these elements should not be limited by these terms. These terms are only used to distinguish one element from another. Thus, a first element could be termed a second element without departing from the teachings of this disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises," "comprising," "includes" or "including," when used in this specification, specify the presence of stated features, steps, operations, elements, and/or components, but do not preclude the presence or addition of one or more other features, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a reader receiver according to some embodiments of the present inventive concept.

Referring to FIG. 1, a reader receiver 10 may include a sample clock providing unit 100, a mixer unit 300 and a base band signal processing unit 500. It will be understood that a "unit" refers to a "circuit."

As will be described with reference to FIGS. 2 and 5, the sample clock providing unit 100 may generate delayed clock signals D1 to D4 by controlling a phase of an initial clock signal INT_CLK. The initial clock signal INT_CLK may be generated in the sample clock providing unit 100. The delayed clock signals D1 to D4 may be generated using the initial clock signal INT_CLK generated in the sample clock providing unit 100. A phase of the initial clock signal INT_CLK may be delayed to generate the delayed clock signals D1 to D4.

For a correct data transfer of the near field communication (NFC), a phase difference between a sample clock signal CLK and a received signal may need to be minimized or optimized. A sampling frequency of the sample clock signal CLK used to sample an input signal RX_IN may vary depending on a carrier frequency of the input signal RX_IN. The carrier frequency may be predetermined in a design process of a wireless communication system. Therefore, controlling the phase of the sample clock signal CLK based on the input signal RX_IN may be an important factor that determines a performance of the wireless communication system.

The sample clock providing unit 100 may provide an I phase sample clock signal I_CLK and a Q phase sample clock signal Q_CLK by selecting a sample clock signal CLK of the delayed clock signals D1 to D4 based on the input signal RX_IN. The delayed clock signals D1 to D4 may be generated by delaying the initial clock signal INT_CLK that is generated in the sample clock providing unit 100. One of the delayed clock signals D1 to D4 may be selected to maximize or optimize a reception performance for the input signal RX_IN. In some embodiments, one of the delayed clock signals D1 to D4 that is selected to maximize or optimize the reception performance for the input signal RX_IN may be used as the I phase sample clock signal I_CLK. Another one of the delayed clock signals D1 to D4 that has an about 90 degree phase shift from the one of the delayed clock signals D1 to D4 that is selected to maximize or optimize the reception performance for the input signal RX_IN may be used as the Q phase sample clock signal Q_CLK.

The mixer unit 300 may convert the input signal RX_IN into base band signals in synchronization with the I phase sample clock signal I_CLK and the Q phase sample clock signal Q_CLK, respectively. The mixer unit 300 may convert the input signal RX_IN into the base band signals by sampling the input signal RX_IN.

The mixer unit 300 may convert the input signal RX_IN into the base band signals in synchronization with a rising edge of the I phase sample clock signal I_CLK and a rising edge of the Q phase sample clock signal Q_CLK. The wireless communication system including the reader receiver 10 according to some embodiments may have a maximum or optimized reception performance, a value of the input signal RX_IN in synchronization with the rising edge of the I phase sample clock signal I_CLK may be a maximum or optimized value of the input signal RX_IN, and a value of the input signal RX_IN in synchronization with the rising edge of the Q phase sample clock signal Q_CLK may be substantially 0. In some alternative embodiments, a value of the input signal RX_IN in synchronization with the rising edge of the I phase sample clock signal I_CLK may be substantially 0, and a value of the input signal RX_IN in synchronization with the rising edge of the Q phase sample clock signal Q_CLK may be a maximum or optimized value of the input signal RX_IN.

In some embodiments, the mixer unit 300 may convert the input signal RX_IN into base band signals in synchronization with a falling edge of the I phase sample clock signal I_CLK and a falling edge of the Q phase sample clock signal Q_CLK. The wireless communication system including the reader receiver 10 according to some embodiments may have a maximum or optimized reception performance, a value of the input signal RX_IN in synchronization with the falling edge of the I phase sample clock signal I_CLK may be a maximum or optimized value of the input signal RX_IN, and a value of the input signal RX_IN in synchronization with the falling edge of the Q phase sample clock signal Q_CLK may be substantially 0. In some alternative embodiments, a value of the input signal RX_IN in synchronization with the falling edge of the I phase sample clock signal I_CLK may be substantially 0, and a value of the input signal RX_IN in synchronization with the falling edge of the Q phase sample clock signal Q_CLK may be a maximum or optimized value of the input signal RX_IN.

The reader receiver 10 according to some embodiments may be implemented using both the I phase sample clock signal I_CLK and the Q phase sample clock signal Q_CLK. In some embodiments, the reader receiver 10 may be implemented using only one of the I phase sample clock signal I_CLK and the Q phase sample clock signal Q_CLK.

When the reader receiver 10 is implemented using both the I phase sample clock signal I_CLK and the Q phase sample clock signal Q_CLK, for maximum or optimized reception performance of the wireless communication system, a value of the input signal RX_IN in synchronization with the rising edge or the falling edge of the I phase sample clock signal I_CLK may be a maximum or optimized value of the input signal RX_IN, or a value of the input signal RX_IN in synchronization with the rising edge or the falling edge of the Q phase sample clock signal Q_CLK may be a maximum or optimized value of the input signal RX_IN.

When the reader receiver 10 is implemented using the I phase sample clock signal I_CLK, for maximum or optimized reception performance of the wireless communication system, a value of the input signal RX_IN in synchronization with the rising edge or the falling edge of the I phase sample clock signal I_CLK may be a maximum or optimized value of the input signal RX_IN.

When the reader receiver 10 is implemented using the Q phase sample clock signal Q_CLK, for maximum or optimized reception performance of the wireless communication system, a value of the input signal RX_IN in synchronization with the rising edge or the falling edge of the Q phase sample clock signal Q_CLK may be a maximum or optimized value of the input signal RX_IN.

The base band signal processing unit 500 may filter and amplify the base band signals. The base band signal processing unit 500 may include a low pass filter and a voltage gain amplifier.

The low pass filer may be used to remove or reduce high frequency components of the base band signals. The voltage gain amplifier may amplify the filtered base band signals for subsequent signal processing.

If the reader receiver 10 according to some embodiments of the present inventive concept is implemented, a design size and a power consumption of the communication system including the reader receiver 10 may be reduced.

Figure 2:
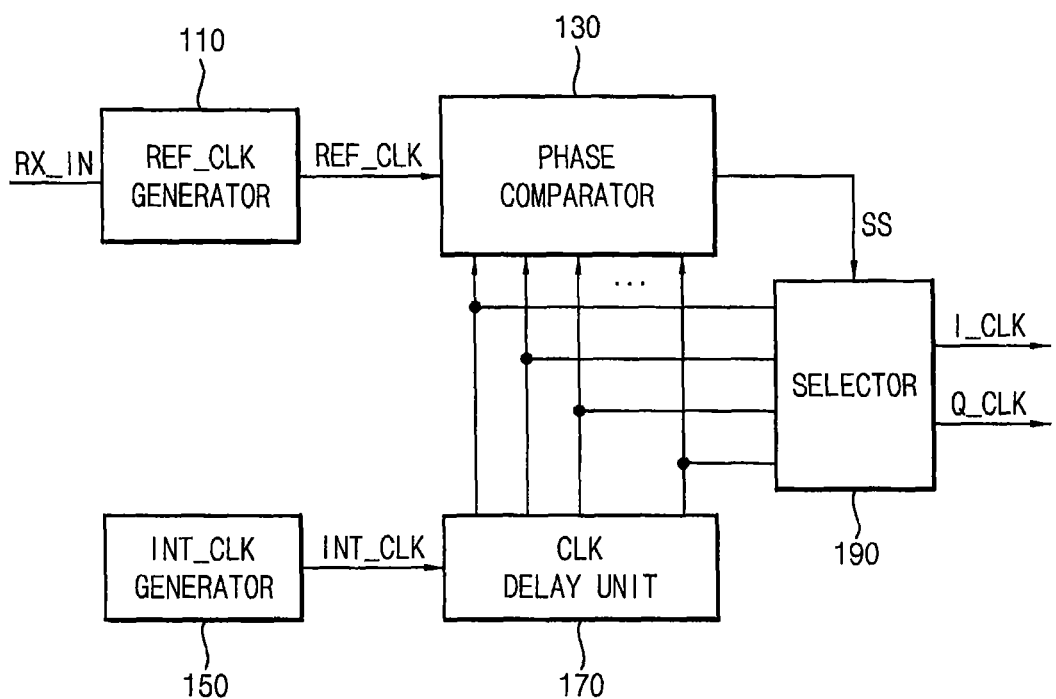
FIG. 2 is a block diagram illustrating a sample clock providing unit according to some embodiments of the present inventive concept.

FIG. 2 is a block diagram illustrating a sample clock providing unit according to some embodiments of the present inventive concept.

Referring to FIG. 2, the sample clock providing unit 100 may include a reference clock generator 110, an initial clock generator 150, a clock delay unit 170, a phase comparator 130 and a selector 190.

The reference clock generator 110 may provide a reference clock signal REF_CLK generated based on the input signal RX_IN. A clock signal having a frequency and a phase the same as a frequency and a phase of the input signal RX_IN may be generated using a limiter circuit. To select the sample clock signal CLK that may maximum or optimize the reception performance of the reader receiver 10 from the delayed clock signals D1 to D4, the reference clock signal REF_CLK may be provided based on the clock signal having the frequency and the phase the same as the frequency and the phase of the input signal RX_IN. A phase of the reference clock signal REF_CLK may be the same as a phase of the sample clock signal CLK that is used for the maximum or optimized reception performance of the reader receiver 10.

The initial clock generator 150 may generate the initial clock signal INT_CLK. The initial clock signal INT_CLK may be used to generate the delayed clock signals D1 to D4.

The clock delay unit 170 may provide the delayed clock signals D1 to D4 by delaying the initial clock signal INT_CLK. The delayed clock signals D1 to D4 may be generated by delaying the initial clock signal INT_CLK. The delayed clock signals D1 to D4 may be provided to the phase comparator 130.

The phase comparator 130 may provide a selection signal SS by comparing a respective phase of each of the delayed clock signals D1 to D4 against a phase of the reference clock signal REF_CLK. The delayed clock signals D1 to D4 may be provided from the clock delay unit 170. The phase of the reference clock signal REF_CLK generated from the reference clock generator 110 may be compared with the phases of the delayed clock signals D1 to D4. The selection signal SS may be provided so that one of the delayed clock signals D1 to D4 that has the least phase difference from the reference clock signal REF_CLK is selected. In some embodiments, the selection signal SS may be provided by identifying which of the delayed clock signals D1 to D4 is most closely aligned in phase to the reference clock signal REF_CLK.

The selector 190 may output the I phase sample clock signal I_CLK and the Q phase sample clock signal Q_CLK by selecting the sample clock signal CLK from the delayed clock signals D1 to D4 based on the selection signal SS. The selector 190 may be implemented using a switch that may select one of the delayed clock signals D1 to D4. The maximum or optimized reception performance of the wireless communication system including the reader receiver 10 may be accomplished using the selected clock signal selected from the delayed clock signals D1 to D4.

For example, the selected clock signal selected from the delayed clock signals D1 to D4 may be used as the I phase sample clock signal I_CLK. One of the delayed clock signals D1 to D4 that has an about 90 degree phase shift from the selected clock signal may be used as the Q phase sample clock signal Q_CLK.

Figure 3:
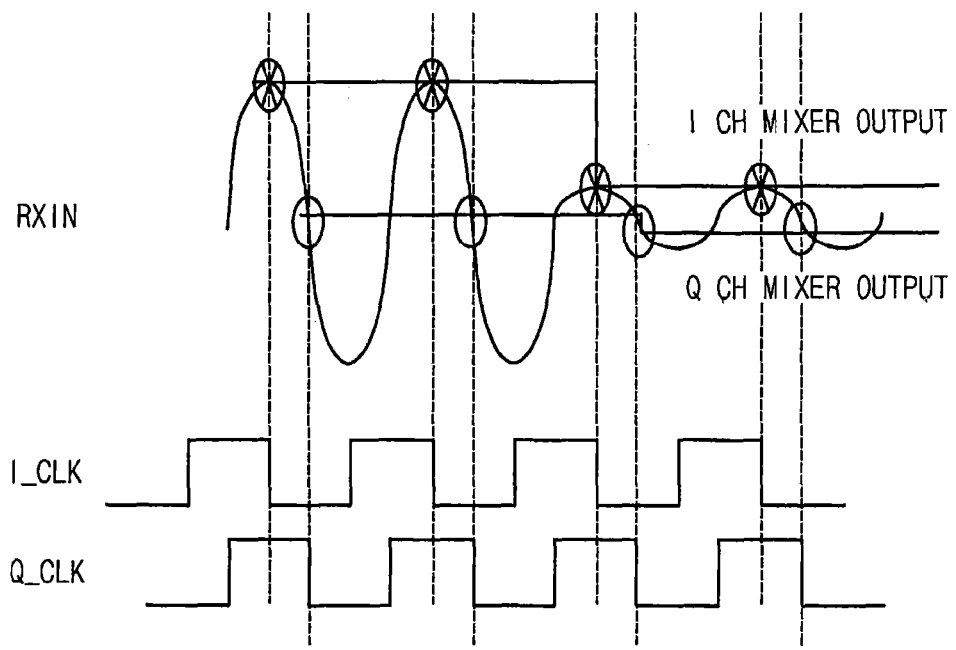
FIG. 3 is a timing diagram illustrating operation of a reader receiver according to some embodiments of the present inventive concept.

FIG. 3 is a timing diagram illustrating operation of a reader receiver according to some embodiments of the present inventive concept.

Referring to FIGS. 2 and 3, the I phase sample clock signal I_CLK and the Q phase sample clock signal Q_CLK may be generated by selecting one of the delayed clock signals D1 to D4 that may have a minimum or optimized phase difference from the reference clock signal REF_CLK. The phase difference between the I phase sample clock signal I_CLK and the Q phase sample clock signal Q_CLK may be about 90 degree. When one of the delayed clock signals D1 to D4 is selected to minimize or optimize the phase difference between the reference clock signal REF_CLK and the delayed clock signals D1 to D4, the reception performance of the wireless communication system may be maximized or optimized.

The input signal RX_IN may be converted into the base band signals in synchronization with the falling edge of the I phase sample clock signal I_CLK and the falling edge of the Q phase sample clock signal Q_CLK. When the reception performance of the wireless communication system including the reader receiver 10 is maximized or optimized, a value of the input signal RX_IN in synchronization with the falling edge of the I phase sample clock signal I_CLK may be a maximum or optimized value of the input signal RX_IN, and a value of the input signal RX_IN in synchronization with the falling edge of the Q phase sample clock signal Q_CLK may be substantially 0.

The details about the reception performance of the wireless communication system including the reader receiver 10, which is discussed above, may also be applied to the wireless communication system in which the input signal RX_IN is converted into the base band signals in synchronization with the rising edge of the I phase sample clock signal I_CLK and the Q phase sample clock signal Q_CLK.

When the input signal RX_IN is converted into the base band signals in synchronization with the falling edge of the I phase sample clock signal I_CLK and the falling edge of the Q phase sample clock signal Q_CLK, a value of the input signal RX_IN in synchronization with the falling edge of the I phase sample clock signal I_CLK is a maximum or optimized value of the input signal RX_IN, and a value of the input signal RX_IN in synchronization with the falling edge of the Q phase sample clock signal Q_CLK may be substantially 0 because a phase difference between the I phase sample clock signal I_CLK and the Q phase sample clock signal Q_CLK may be about 90 degree. In some embodiments, the input signal RX_IN may be a sine wave. A value of the sine wave may be substantially 0 at a phase that is shifted about 90 degree from a phase at which the sine wave has a maximum value.

When a value of the input signal RX_IN in synchronization with the falling edge of the I phase sample clock signal I_CLK is a maximum or optimized value of the input signal RX_IN, the reader receiver 10 may be implemented using the I phase sample clock signal I_CLK only.

Figure 4:
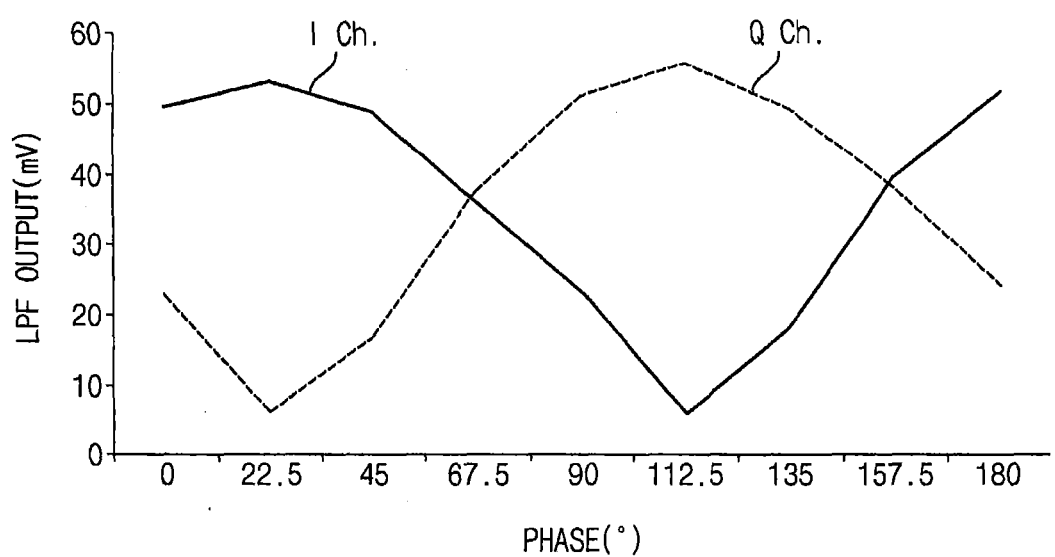
FIG. 4 is a diagram illustrating operation of a reader receiver according to some embodiments of the present inventive concept.

FIG. 4 is a diagram illustrating operation of a reader receiver according to some embodiments of the present inventive concept.

Referring to FIG. 4, the diagram may be obtained where the input signal RX_IN is sampled using one of the delayed clock signals D1 to D4. The result may be an output of a low pass filter (LPF) included in the base band signal processing unit 500. The reader receiver 10 may be implemented using both the I phase clock signal and the Q phase clock signal, and the output of the low pass filter may include an I channel output I Ch. and a Q channel output Q Ch.

As a phase difference between the reference clock signal REF_CLK and the one of the delayed clock signals D1 to D4 increase, the I channel output I Ch. and the Q channel output Q Ch. may show reverse characteristic. Specifically, the phase difference between the input signal RX_IN and the one of the delay clock signals D1 to D4 is in a range of about 0 degree to about 22.5 degree, the I channel output I Ch. may increase, and the Q channel output Q Ch. may decrease. When the phase difference between the input signal RX_IN and the one of the delay clock signals D1 to D4 is about 22.5 degree, the I channel output I Ch. may be maximized or optimized, and the Q channel output Q Ch. may be minimized or reduced. When the phase difference between the input signal RX_IN and the one of the delay clock signals D1 to D4 is in a range of about 22.5 degree to about 112.5 degree, the I channel output I Ch. may decrease, and the Q channel output Q Ch. may increase. When the phase difference between the input signal RX_IN and the one of the delay clock signals D1 to D4 is about 112.5 degree, the I channel output I Ch. may be minimized or reduced, and the Q channel output Q Ch. may be maximized or optimized.

In this case, the phase difference between the reference clock signal REF_CLK and the input signal RX_IN may be about 22.5 degree. One of the delay clock signals D1 to D4 that minimizes or optimizes the phase difference may be selected as the sample clock signal CLK by comparing a respective phase of each of the delayed clock signals D1 to D4 against a phase of the reference clock signal REF_CLK. When a phase difference between the input signal RX_IN and the one of the delay clock signals D1 to D4 is about 22.5 degree, the I channel output I Ch. may be maximized or optimized, and the reception performance of the wireless communication system including the reader receiver 10 may be maximized or optimized.

Figure 5:
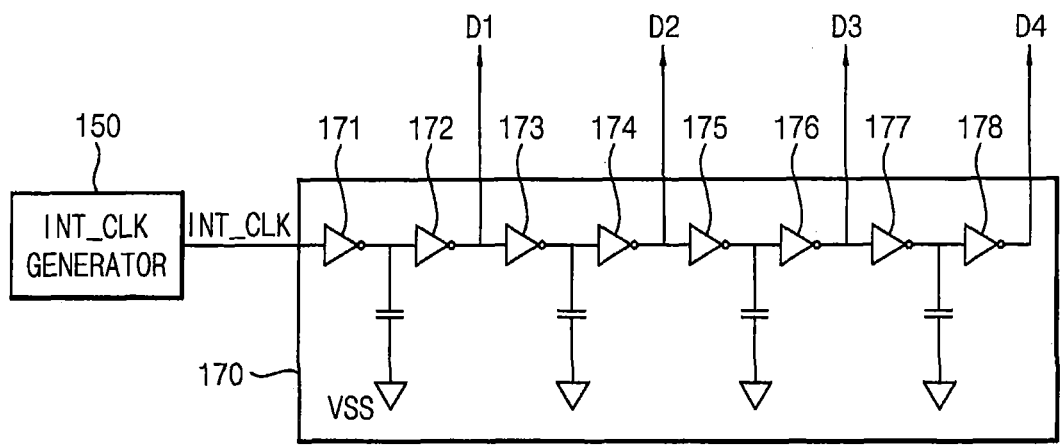
FIG. 5 is a circuit diagram illustrating a clock delay unit according to some embodiments of the present inventive concept.

FIG. 5 is a circuit diagram illustrating a clock delay unit according to some embodiments of the present inventive concept.

Referring to FIG. 5, the clock delay unit 170 may provide the delayed clock signals D1 to D4 by controlling a phase of the initial clock signal INT_CLK using delay cells. The delay cells may include inverters 171 to 178. If the initial clock signal INT_CLK is transmitted through the inverter, a propagation delay may be generated. The delayed clock signals D1 to D4 may be generated using the propagation delay.

The delayed clock signals D1 to D4 may be outputs of some of the inverters 171 to 178. The delayed clock signals D1 to D4 may have phase shifts of about 0 degree to about 180 degree from the initial clock signal INT_CLK and may be outputs of the even number inverters 172, 174, 176 and 178. The delayed clock signal 1 D1 may be the output of the inverter 2 172. The delayed clock signal 2 D2 may be the output of the inverter 4 174. The delayed clock signal 3 D3 may be the output of the inverter 6 176. The delayed clock signal 4 D4 may be the output of the inverter 8 178. The delayed clock signals having phase shifts of about 180 degree to about 360 degree from the initial clock signal INT_CLK may be outputs of the odd number inverters 171, 173, 175 and 177. The delayed clock signal 5 may be the output of the inverter 1 171. The delayed clock signal 6 may be the output of the inverter 3 173. The delayed clock signal 7 may be the output of the inverter 5 175. The delayed clock signal 8 may be the output of the inverter 7 177.

An interval of controlling the phase of the sample clock signal CLK may decrease as a number of the delayed clock signals D1 to D4 increases. The phase of the sample clock signal CLK may be controlled or changed with a smaller interval as a number of the delayed clock signals D1 to D4 increases. To increase the number of the delayed clock signals D1 to D4, a number of the inverters 171 to 178 used as the delay cells may need to be increased. Because a range of the phase difference is from 0 degree to 360 degree, if the number of the delayed clock signals D1 to D4 increases, the interval of controlling the phase of the sample clock signal CLK may decrease.

In some embodiments, one of the delayed clock signals D1 to D4 may be selected as a sample clock signal CLK to minimize or optimize a phase difference between the sample clock signal CLK and the reference clock signal REF_CLK. If the phase difference between the reference clock signal REF_CLK and the sample clock signal CLK is minimized or optimized, a value of the input signal RX_IN in synchronization with the falling edge of the I phase sample clock signal I_CLK may be a maximum or optimized value of the input signal RX_IN, and a value of the input signal RX_IN in synchronization with the falling edge of the Q phase sample clock signal Q_CLK may be substantially 0. In some alternative embodiments, a value of the input signal RX_IN in synchronization with the falling edge of the I phase sample clock signal I_CLK may be substantially 0, and a value of the input signal RX_IN in synchronization with the falling edge of the Q phase sample clock signal Q_CLK may be a maximum or optimized value of the input signal RX_IN.

When one of the delayed clock signals D1 to D4 that minimizes or optimizes a phase difference from the reference clock signal REF_CLK is selected, the reception performance of the wireless communication system including the reader receiver 10 may be maximized or optimized.

If the reader receiver 10 according to some embodiments of the present inventive concept is implemented, a design size and a power consumption of the communication system including the reader receiver 10 may be reduced.

Figure 6:
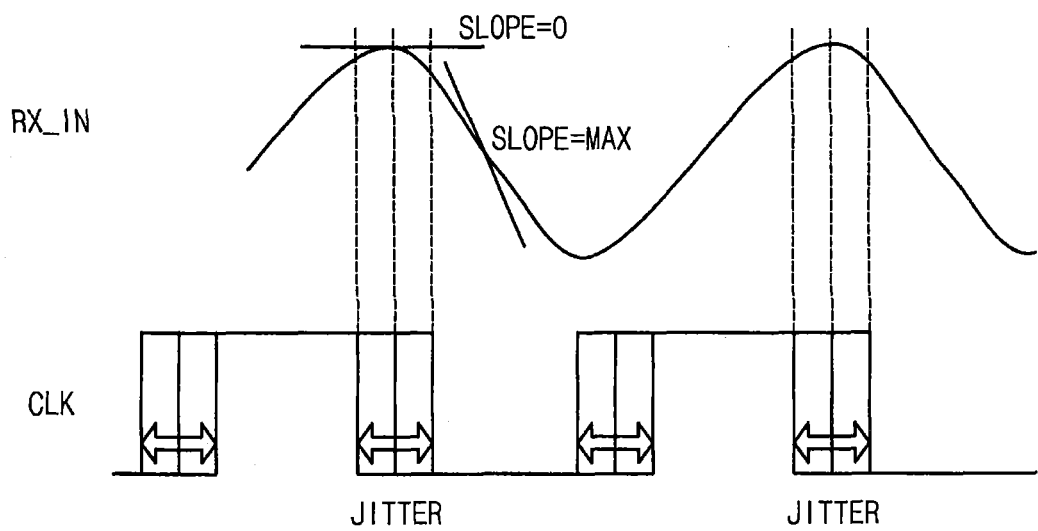
FIG. 6 is a diagram describing a phase noise of a sample clock signal.

FIG. 6 is a diagram describing a phase noise of a sample clock signal.

Referring to FIG. 6, a phase of the sample clock signal CLK may be controlled to reduce a phase noise of the sample clock signal CLK. In some embodiments, the input signal RX_IN may be a sine wave. The slope of the tangent line of the sine wave at minimum and maximum points is substantially 0. The slope of the tangent line of the sine wave is maximized at a phase that is shifted 90 degree from the minimum or maximum point. In other words, a variation of amplitude of the input signal RX_IN per unit time may be minimized or optimized at the minimum and maximum points. Therefore the phase noise of the sample clock signal CLK may be minimized or reduced when the phase difference between the reference clock signal REF_CLK and the sample clock signal CLK is minimized or optimized.

For example, a jitter of the sample clock signal CLK may be constant. When the input signal RX_IN is sampled using the sample clock signal CLK at the maximum or minimum point of the input signal RX_IN, the variation of the sampled value by the jitter of the sample clock signal CLK may decrease. However, when the input signal RX_IN is sampled using the sample clock signal CLK at a phase that is shifted about 90 degree from the maximum or minimum point of the input signal RX_IN, the variation of the sampled value by the jitter of the sample clock signal CLK may increase. The phase noise may be the variation of the sampled valued by the jitter of the sample clock signal CLK.

Figure 7:
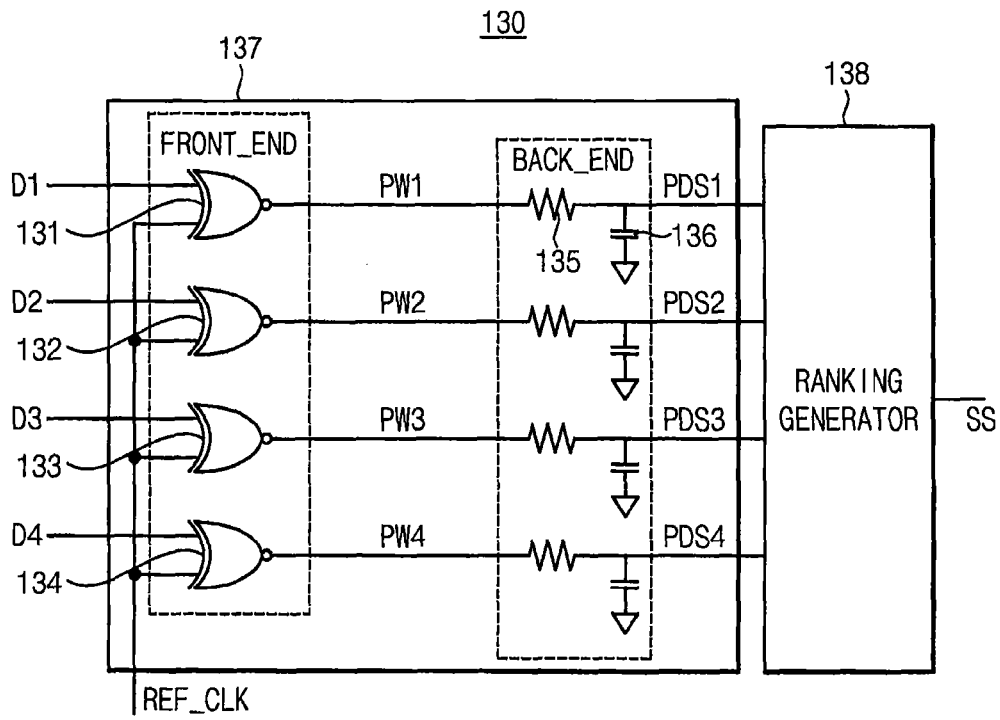
FIG. 7 is a circuit diagram illustrating a phase comparator according to some embodiments of the present inventive concept.

FIG. 7 is a circuit diagram illustrating a phase comparator according to some embodiments of the present inventive concept.

Referring to FIG. 7, the phase comparator 130 may include a phase comparing unit 137 and a ranking generator 138.

The phase comparing unit 137 may output phase difference signals PDS1 to PDS4 by comparing a respective phase of each of the delayed clock signals D1 to D4 against a phase of the reference clock signal REF_CLK. The phase differences between the reference clock signal REF_CLK and each of the delayed clock signals D1 to D4 may be obtained using exclusive-nor (XNOR) gates 131, 132, 133 and 134. Inputs of the XNOR gate 1 131 may be the delayed clock signal 1 D1 and the reference clock signal REF_CLK. Inputs of the XNOR gate 2 132 may be the delayed clock signal 2 D2 and the reference clock signal REF_CLK. Inputs of the XNOR gate 3 133 may be the delayed clock signal 3 D3 and the reference clock signal REF_CLK. Inputs of the XNOR gate 4 134 may be the delayed clock signal 4 D4 and the reference clock signal REF_CLK.

The ranking generator 138 may determine phase difference rankings of the phase difference signals PDS1 to PDS4 and may provide the selection signal SS based on the phase difference rankings. The ranking generator 138 may arrange the phase differences between the reference clock signal REF_CLK and the delayed clock signals D1 to D4 in order. The selection signal SS may be selected so that one of the delayed clock signals D1 to D4 that has a minimum or optimized phase difference from the reference clock signal REF_CLK is selected. In some embodiments, the selection signal SS may be provided by identifying which of the delayed clock signals D1 to D4 is most closely aligned in phase to the reference clock signal REF_CLK.

Figure 8:
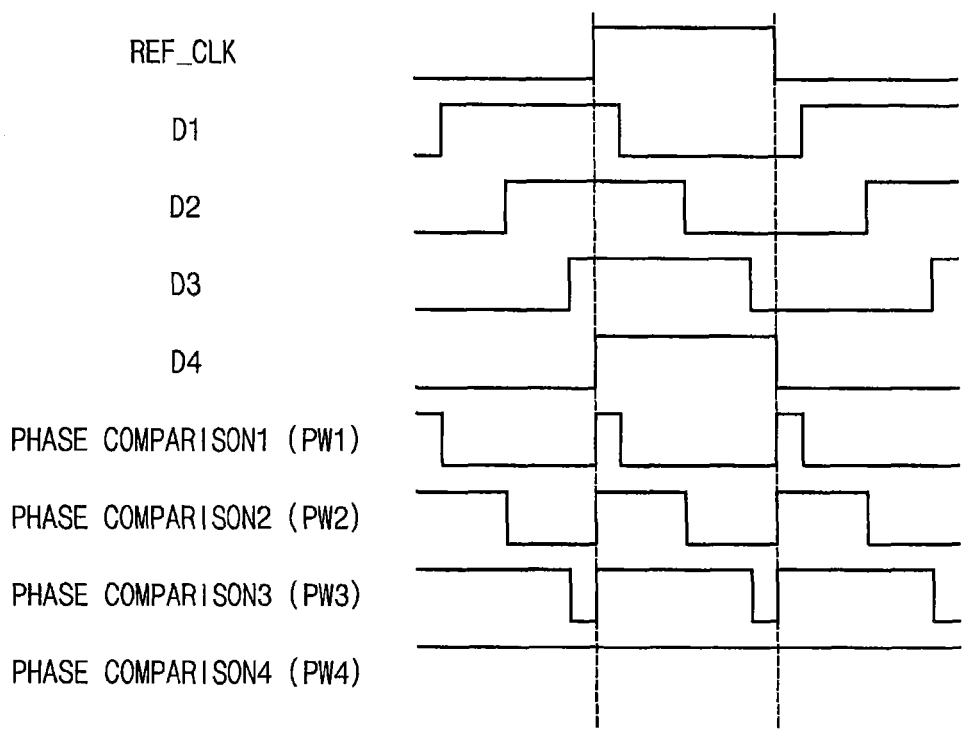
FIG. 8 is a timing diagram illustrating operation of a front end of a phase comparing unit according to some embodiments of the present inventive concept.

FIG. 8 is a timing diagram illustrating operation of a front-end of a phase comparing unit according to some embodiments of the present inventive concept.

Referring to FIGS. 7 and 8, a front-end of the phase comparing unit 137 may include the XNOR gates 131, 132, 133 and 134. The phase differences between the reference clock signal REF_CLK and the delayed clock signals D1 to D4 may be represented as pulse widths PW1 to PW4 corresponding to the phase differences. An output of the first XNOR may be a pulse width 1 PW1 that is provided based on the delayed clock signal 1 D1 and the reference clock signal REF_CLK. An output of the second XNOR may be a pulse width 2 PW2 that is provided based on the delayed clock signal 2 D2 and the reference clock signal REF_CLK. An output of the third XNOR may be a pulse width 3 PW3 that is provided based on the delayed clock signal 3 D3 and the reference clock signal REF_CLK. An output of the fourth XNOR may be a pulse width 4 PW4 that is provided based on the delayed clock signal 4 D4 and the reference clock signal REF_CLK.

The front-end of the phase comparing unit 137 may include the XNOR gates 131, 132, 133 and 134 as illustrated in FIG. 7. However, the front-end of the phase comparing unit 137 may be implemented using XOR gates.

Figure 9:
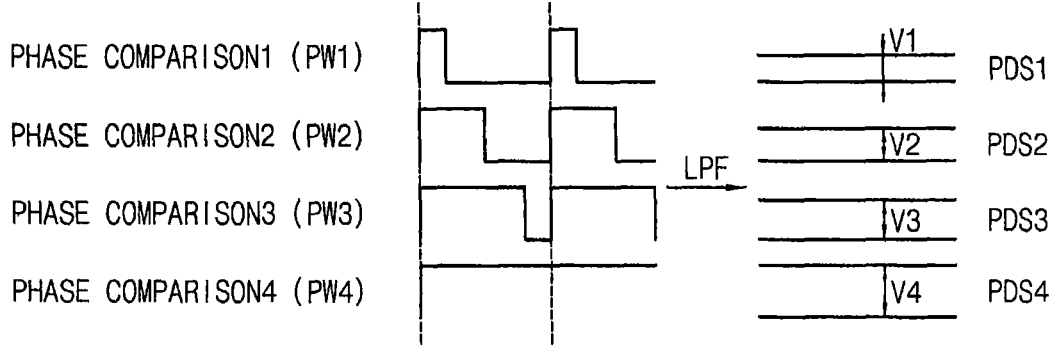
FIG. 9 is a timing diagram illustrating operation of a back end of a phase comparing unit according to some embodiments of the present inventive concept.

FIG. 9 is a timing diagram illustrating operation of a back-end of a phase comparing unit according to some embodiments of the present inventive concept.

Referring to FIGS. 7 and 9, a back-end of the phase comparing unit 137 may include resistors 135 and capacitors 136. The back-end of the phase comparing unit 137 may be low pass filters. The phase comparing unit 137 may output the phase difference signals PDS1 to PDS4 by converting the pulse widths PW1 to PW4 into amplitudes of voltages or currents. The low pass filters may be used to convert the pulse widths PW1 to PW4 into amplitudes of the voltages. A phase difference signal 1 PDS1 as a voltage 1 may be obtained by low-pass-filtering the pulse width 1 PW1. A phase difference signal 2 PDS2 as a voltage 2 may be obtained by low-pass-filtering the pulse width 2 PW2. A phase difference signal 3 PDS3 as a voltage 3 may be obtained by low-pass-filtering the pulse width 3 PW3. A phase difference signal 4 PDS4 as a voltage 4 may be obtained by low-pass-filtering the pulse width 4 PW4.

Figure 10:
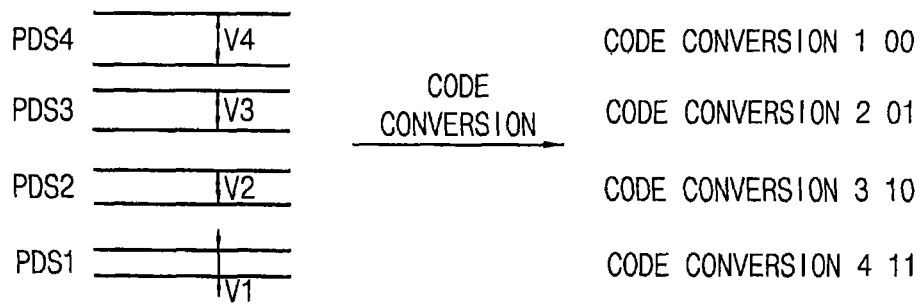
FIG. 10 is a diagram illustrating operation of a ranking generator according to some embodiments of the present inventive concept.

FIG. 10 is a diagram illustrating operation of a ranking generator according to some embodiments of the present inventive concept.

Referring to FIG. 10, the phase difference rankings may be digital codes obtained from the amplitudes of the voltages or the currents of the phase difference signals PDS1 to PDS4.

The digital codes may be arranged in a descending order in which a value of the phase difference signal decreases as a value of the digital code increases.

When the digital codes are arranged in the descending order, values of the phase difference signals may decrease in order of a phase difference signal 4 PDS4, a phase difference signal 3 PDS3, a phase difference signal 2 PDS2 and a phase difference signal 1 PDS1. The phase difference signal 4 PDS4 may be converted into the digital code 00. The phase difference signal 3 PDS3 may be converted into the digital code 01. The phase difference signal 2 PDS2 may be converted into the digital code 10. The phase difference signal 1 PDS1 may be converted into the digital code 11.

Figure 11:
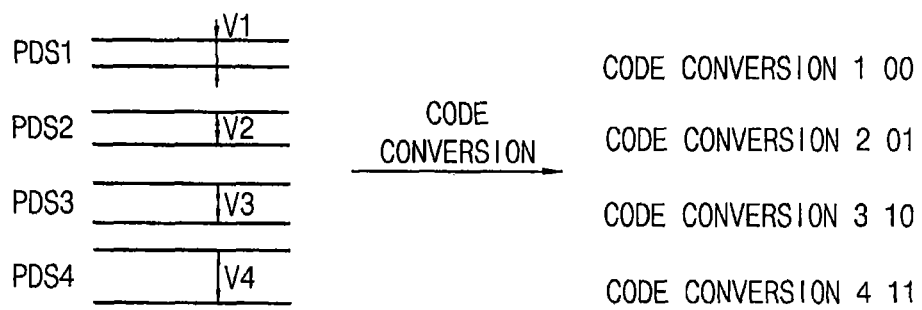
FIG. 11 is a diagram illustrating operation of a ranking generator according to some embodiments of the present inventive concept.

FIG. 11 is a diagram illustrating operation of a ranking generator according to some embodiments of the present inventive concept.

Referring to FIG. 11, the digital codes may be arranged in an ascending order in which a value of the phase difference signal increases as a value of the digital codes increases.

When the digital codes are arranged in the ascending order, values of the phase difference signals may increase in order of a phase difference signal 1 PDS1, a phase difference signal 2 PDS2, a phase difference signal 3 PDS3 and a phase difference signal 4 PDS4. The phase difference signal 1 PDS1 may be converted into the digital code 00. The phase difference signal 2 PDS2 may be converted into the digital code 01. The phase difference signal 3 PDS3 may be converted into the digital code 10. The phase difference signal 4 PDS4 may be converted into the digital code 11.

In some embodiments, when the digital codes are arranged in the descending order, the first digital code of the arranged digital codes may be provided as the selection signal SS. For example, in the descending order, the first digital code 00 may be provided as the selection signal SS. If the digital code 00 is selected, the delayed clock signal that minimizes or optimizes the phase difference between the reference clock signal REF_CLK and the delayed clock signals D1 to D4 may be selected. In this case, the reception performance of the wireless communication system including the reader receiver 10 may be maximized or optimized.

In some embodiments, when the digital codes are arranged in the ascending order, the last digital code of the arranged digital codes may be provided as the selection signal SS.

For example, in the ascending order, the last digital code 11 may be provided as the selection signal SS. If the digital code 11 is selected, the delayed clock signal that minimizes or optimizes the phase difference between the reference clock signal REF_CLK and the delayed clock signals D1 to D4 may be selected. In this case, the reception performance of the wireless communication system including the reader receiver 10 may be maximized or optimized.

Figure 12:
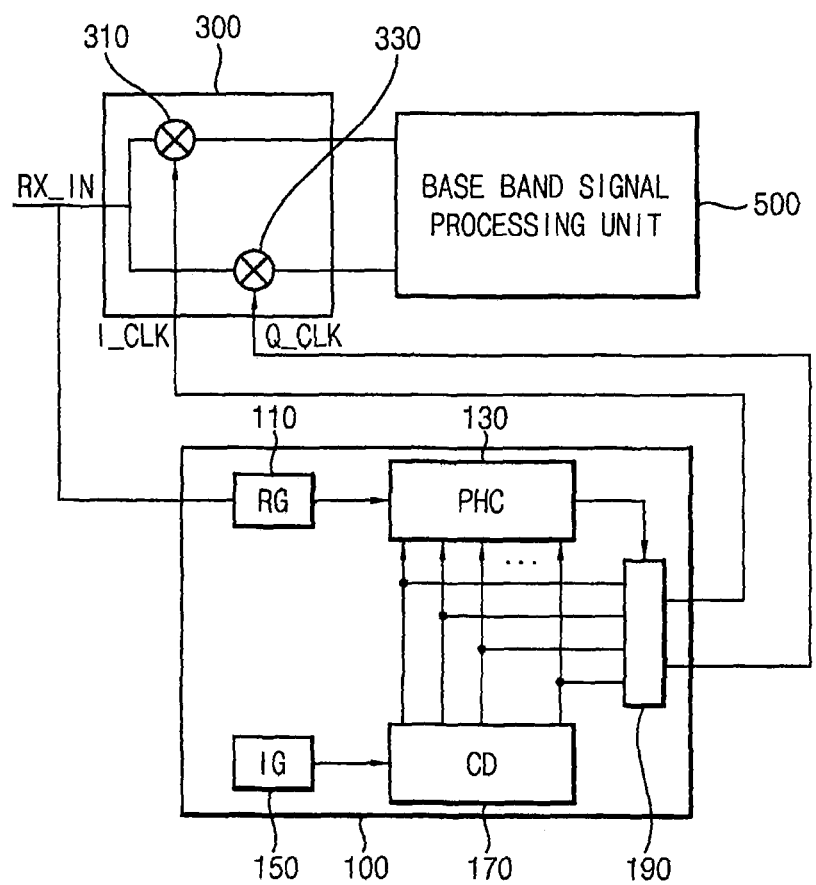
FIG. 12 is a block diagram illustrating a reader receiver according to some embodiments of the present inventive concept.

FIG. 12 is a block diagram illustrating a reader receiver according to some embodiments of the present inventive concept.

Referring to FIG. 12, a reader receiver 10 may include a sample clock providing unit 100, a mixer unit 300 and a base band signal processing unit 500.

The sample clock providing unit 100 may include a reference clock generator 110, an initial clock generator 150, a clock delay unit 170, a phase comparator 130 and a selector 190.

The reference clock generator 110 may provide the reference clock signal REF_CLK generated based on the input signal RX_IN. To select the sample clock signal CLK from the delayed clock signals D1 to D4, the reference clock signal REF_CLK may be provided based on the clock signal having a frequency and a phase the same as a frequency and a phase of the input signal RX_IN.

The initial clock generator 150 may generate the initial clock signal INT_CLK. The initial clock signal INT_CLK may be used to generate the delayed clock signals D1 to D4.

The clock delay unit 170 may provide the delayed clock signals D1 to D4 by delaying the initial clock signal INT_CLK. The delayed clock signals D1 to D4 may be generated by delaying the initial clock signal INT_CLK. The delayed clock signals D1 to D4 may be provided to the phase comparator 130.

The phase comparator 130 may provide the selection signal SS by comparing a respective phase of each of the delayed clock signals D1 to D4 against a phase of the reference clock signal REF_CLK. The delayed clock signals D1 to D4 may be provided from the clock delay unit 170. The phase of the reference clock signal REF_CLK that is generated from the reference clock generator 110 may be compared with the phases of the delayed clock signals D1 to D4. The selection signal SS may be provided so that one of the delayed clock signals D1 to D4 that has the least phase difference from the reference clock signal REF_CLK is selected. In some embodiments, the selection signal SS may be provided by identifying which of the delayed clock signals D1 to D4 is most closely aligned in phase to the reference clock signal REF_CLK.

The selector 190 may output the I phase sample clock signal I_CLK and the Q phase sample clock signal Q_CLK by selecting the sample clock signal CLK from the delayed clock signals D1 to D4 based on the selection signal SS. The selector 190 may be implemented using a switch that may select one of the delayed clock signals D1 to D4. The maximum or optimized reception performance of the wireless communication system including the reader receiver 10 may be accomplished using the selected clock signal selected from the delayed clock signals D1 to D4.

For example, the selected clock signal of the delayed clock signals D1 to D4 may be used as the I phase sample clock signal I_CLK. One of the delayed clock signals D1 to D4 having an about 90 degree phase shift from the selected clock signal may be used as the Q phase sample clock signal Q_CLK.

If the reader receiver 10 according to some embodiments is implemented, a design size and a power consumption of the communication system including the reader receiver 10 may be reduced.

Figure 13:
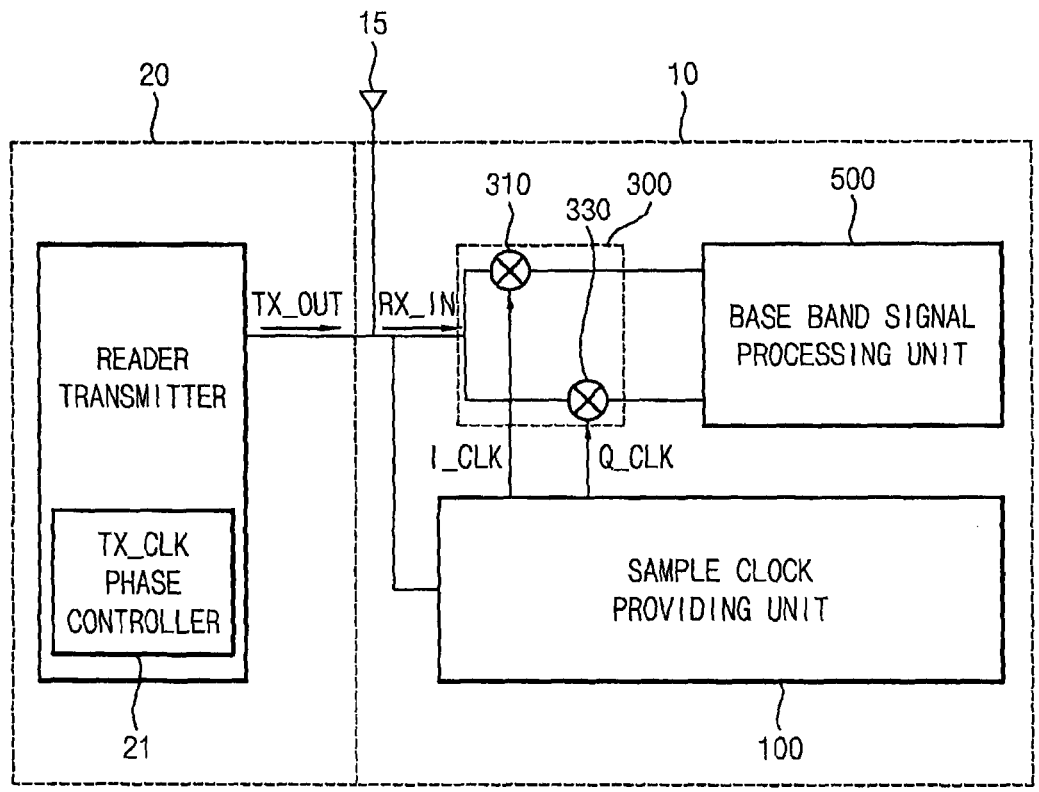
FIG. 13 is a block diagram illustrating a reader transceiver according to some embodiments of the present inventive concept.

FIG. 13 is a block diagram illustrating a reader transceiver according to some embodiments of the present inventive concept.

Referring to FIG. 13, a reader transceiver 30 may include a reader transmitter 20 and a reader receiver 10. The reader transmitter 20 may transmit an output signal TX_OUT in synchronization with a transmission clock signal. The reader transmitter 20 may include a TX_CLK phase controller 21. The TX_CLK phase controller 21 may control a phase of the transmission clock signal.

The reader receiver 10 may process an input signal RX_IN. The reader receiver 10 may include a sample clock providing unit 100, a mixer unit 300 and a base band signal processing unit 500. The sample clock providing unit 100 may generate delayed clock signals D1 to D4 by controlling a phase of an initial clock signal INT_CLK. The initial clock signal INT_CLK may be generated in the sample clock providing unit 100. The delayed clock signals D1 to D4 may be generated using the initial clock signal INT_CLK generated in the sample clock providing unit 100. A phase of the initial clock signal INT_CLK may be controlled by delaying the initial clock signal INT_CLK.

For a correct data transfer of the near field communication, a phase difference between a sample clock signal CLK and a received signal may need to be minimized or optimized. A sampling frequency of the sample clock signal CLK used to sample an input signal RX_IN may vary depending on a carrier frequency of the input signal RX_IN. The carrier frequency may be predetermined in a design process of a wireless communication system. Therefore, controlling the phase of the sample clock signal CLK based on the input signal RX_IN may be an important factor that determines a performance of the wireless communication system.

The sample clock providing unit 100 may provide an I phase sample clock signal I_CLK and a Q phase sample clock signal Q_CLK by selecting the sample clock signal CLK of the delayed clock signals D1 to D4 based on an input signal RX_IN. The delayed clock signals D1 to D4 may be generated by delaying the initial clock signal INT_CLK that is generated in the sample clock providing unit 100. One of the delayed clock signals D1 to D4 may be selected to maximize or optimize a reception performance for the input signal RX_IN. The one of the delayed clock signal that is selected to maximize or optimize the reception performance for the input signal RX_IN may be used as the I phase sample clock signal I_CLK. Another one of the delayed clock signals D1 to D4 that has an about 90 degree phase shift from the one of the delayed clock signals that is selected to maximize or optimize the reception performance for the input signal RX_IN may be used as the Q phase sample clock signal Q_CLK.

The mixer unit 300 may convert the input signal RX_IN into the base band signals in synchronization with the I phase sample clock signal I_CLK and the Q phase sample clock signal Q_CLK. The mixer unit 300 may convert the input signal RX_IN into the base band signals by sampling the input signal RX_IN.

The mixer unit 300 may convert the input signal RX_IN into the base band signals in synchronization with a rising edge of the I phase sample clock signal I_CLK and a rising edge of the Q phase sample clock signal Q_CLK. The wireless communication system including the reader receiver 10 according to some embodiments may have a maximum or optimized reception performance, a value of the input signal RX_IN in synchronization with the rising edge of the I phase sample clock signal I_CLK may be a maximum or optimized value of the input signal RX_IN, and a value of the input signal RX_IN in synchronization with the rising edge of the Q phase sample clock signal Q_CLK may be substantially 0. In some alternative embodiments, a value of the input signal RX_IN in synchronization with the rising edge of the I phase sample clock signal I_CLK may be substantially 0, and a value of the input signal RX_IN in synchronization with the rising edge of the Q phase sample clock signal Q_CLK may be a maximum or optimized value of the input signal RX_IN.

In some embodiments, mixer unit 300 may convert the input signal RX_IN into base band signals in synchronization with a falling edge of the I phase sample clock signal I_CLK and a falling edge of the Q phase sample clock signal Q_CLK.

The reader receiver 10 according to some embodiments may be implemented using both the I phase sample clock signal I_CLK and the Q phase sample clock signal Q_CLK. In some embodiments, the reader receiver 10 may be implemented using only one of the I phase sample clock signal I_CLK and the Q phase sample clock signal Q_CLK.

When the reader receiver 10 is implemented using both the I phase sample clock signal I_CLK and the Q phase sample clock signal Q_CLK, for maximum or optimized reception performance of the wireless communication system, a value of the input signal RX_IN in synchronization with the rising edge or the falling edge of the I phase sample clock signal I_CLK may be a maximum or optimized value of the input signal RX_IN, or a value of the input signal RX_IN in synchronization with the rising edge or the falling edge of the Q phase sample clock signal Q_CLK may be a maximum or optimized value of the input signal RX_IN.

When the reader receiver 10 is implemented using the I phase sample clock signal I_CLK, for maximum or optimized reception performance of the wireless communication system, a value of the input signal RX_IN in synchronization with the rising edge or the falling edge of the I phase sample clock signal I_CLK may be a maximum or optimized value of the input signal RX_IN.

When the reader receiver 10 is implemented using the Q phase sample clock signal Q_CLK, for maximum or optimized reception performance of the wireless communication system, a value of the input signal RX_IN in synchronization with the rising edge or the falling edge of the Q phase sample clock signal Q_CLK may be a maximum or optimized value of the input signal RX_IN.

The base band signal processing unit 500 may filter and amplify the base band signals. The base band signal processing unit 500 may include a low pass filter and a voltage gain amplifier.

The low pass filer may be used to remove or reduce high frequency components of the base band signals. The voltage gain amplifier may amplify the filtered base band signals for subsequent signal processing.

If the reader receiver 10 according to some embodiments is implemented, a design size and a power consumption of the communication system including the reader receiver 10 may be reduced.

In some embodiments, the I phase sample clock signal I_CLK and the Q phase sample clock signal Q_CLK may be provided by controlling a phase of the transmission clock signal. Several different methods of minimizing or optimizing the phase difference between the reference clock signal REF_CLK and the sample clock signal CLK may be applied. For example, one of the delayed clock signals D1 to D4 that minimizes or optimizes the phase difference from the reference clock signal REF_CLK may be selected as the sample clock signal CLK. Alternatively, the sample clock signal CLK that minimizes or optimizes the phase difference between the reference clock signal REF_CLK and the sample clock signal CLK may be selected by controlling a phase of the transmission clock signal in the reader receiver 10 and the reader transmitter 20. If the sample clock signal CLK that minimizes or optimizes the phase difference between the reference clock signal REF_CLK and the sample clock signal CLK is selected by controlling the phase of the transmission clock signal, the selected sample clock signal CLK may be used as the I phase sample clock signal I_CLK. A clock signal having an about 90 degree phase shift from the selected sample clock signal CLK may be used as the Q phase sample clock signal Q_CLK.

Figure 14:
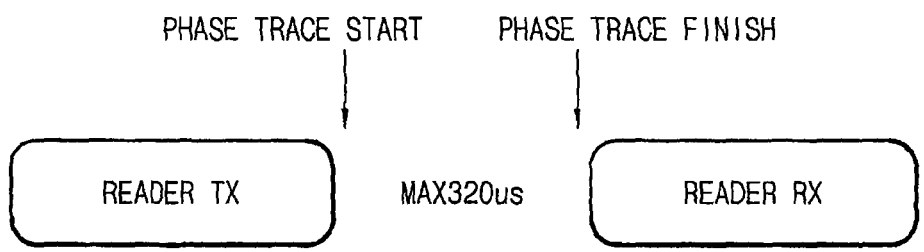
FIG. 14 is a timing diagram illustrating an operation of a phase trace unit.

FIG. 14 is a timing diagram illustrating an operation of a phase trace unit.

Referring to FIG. 14, a tracing process for the I phase sample clock signal I_CLK and the Q phase sample clock signal Q_CLK may be performed between an end of a reader transmission interval and a start of a reader reception interval. The tracing process may start at the end of the reader transmission interval and may end at the start of the reader reception interval. The time interval between the end of the reader transmission interval and the start of the reader reception interval may be maximum 320 us based on the ISO1443.

Figure 15:
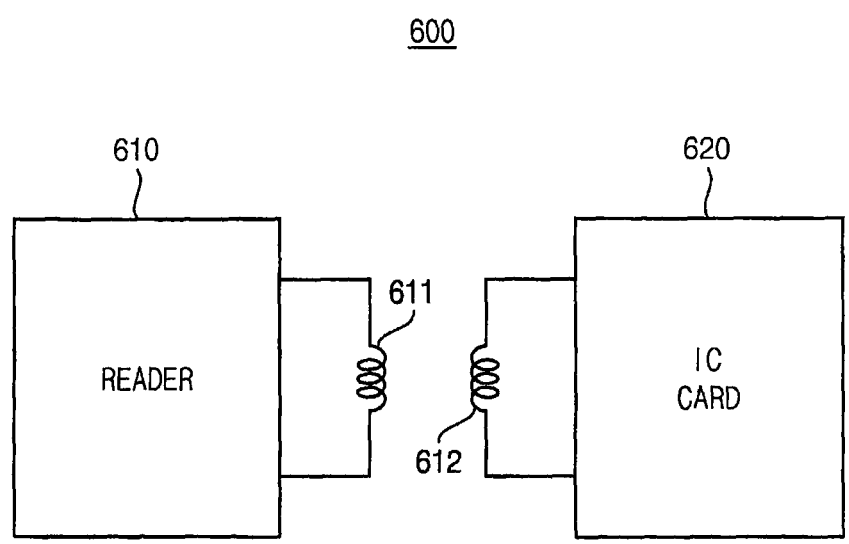
FIG. 15 is a diagram illustrating a contactless IC card system including a reader transceiver according to some embodiments of the present inventive concept.

FIG. 15 is a diagram illustrating a contactless IC card system including a reader transceiver according to some embodiments of the present inventive concept.

Referring to FIG. 15, a contactless IC card system 600 may include a contactless IC card reader 610, a contactless IC card 620, a first antenna 611 and a second antenna 612. The contactless IC card reader 610 and the contactless IC card 620 may exchange data with each other through the first and second antennas 611 and 612. The contactless IC card 620 may receive a voltage from the first antenna 611 through the second antenna 612. The contactless IC card 620 may select a reference voltage for a regulator in an internal voltage generator according to an operation mode that is determined based on whether the internal circuit performs an encryption operation. Thus, a fluctuation component may be reduced or prevented from being transferred to the input voltage. Therefore, the contactless IC card 620 may reduce or prevent transmission errors that may occur when the internal circuit performs an encryption operation.

If the reader receiver according to some embodiments is implemented, a design size and a power consumption of the communication system including the reader receiver may be reduced.

Figure 16:
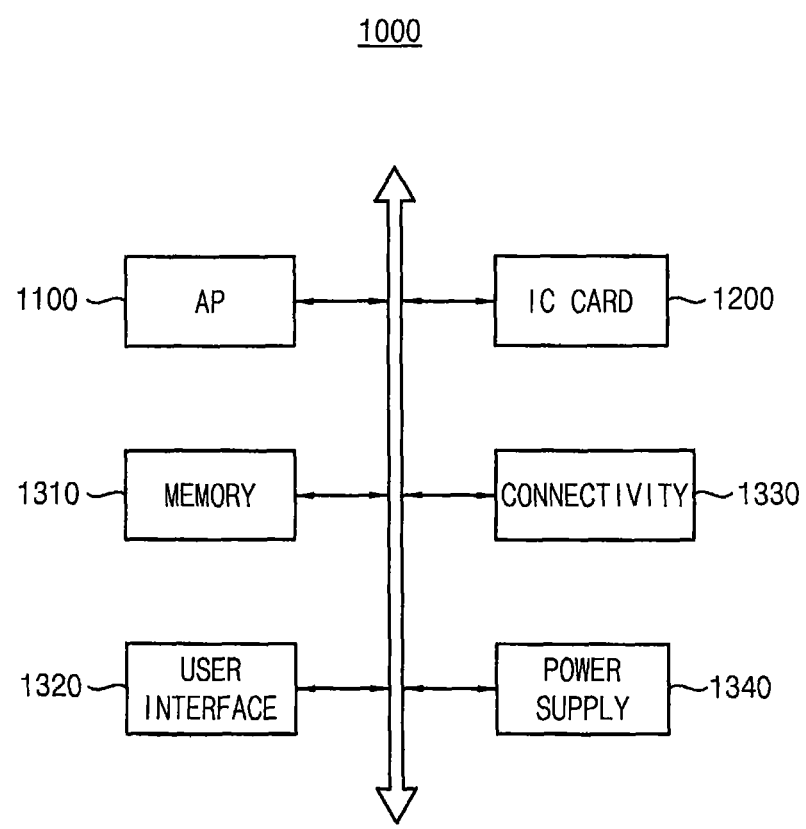
FIG. 16 is a block diagram illustrating a mobile system transceiver according to some embodiments of the present inventive concept.

FIG. 16 is a block diagram illustrating a mobile system transceiver according to some embodiments of the present inventive concept.

Referring to FIG. 16, a mobile system 1000 may include an application processor 1100, a contactless IC card 1200, a memory 1310, a user interface 1320, a connectivity unit 1330, and a power supply 1340. According to some embodiments, the mobile system 1000 may be any kind of mobile system, such as a mobile phone, a smart phone, a personal digital assistant (PDA), a portable multimedia player (PMP), a digital camera, a portable game console, a music player, a camcorder, a video player, a navigation system, etc.

The application processor 1100 may execute applications, such as a web browser, a game application, a video player, etc. In some embodiments, the application processor 1100 may include a single core or multiple cores. For example, the application processor 1100 may be a multi-core processor, such as a dual-core processor, a quad-core processor, a hexa-core processor, etc. According to some embodiments, the application processor 1110 may be coupled to an internal/external cache memory.

The memory device 1310 may store a boot image for booting the mobile system 1000, output data to be transmitted to an external device, and input data from external devices. For example, the memory device 1310 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The contactless IC card 1200 may select a reference voltage for a regulator in an internal voltage generator according to an operation mode that is determined based on whether the internal circuit performs an encryption operation. Thus, a fluctuation component may be reduced or prevented from being transferred to the input voltage. Therefore, the contactless IC card 1200 may reduce or prevent transmission errors that may occur when the internal circuit performs an encryption operation.

The user interface 1320 may include at least one input device, such as a keypad, a touch screen, etc., and at least one output device, such as a speaker, a display device, etc. The power supply 1340 may supply a power supply voltage to the mobile system 1000.

The connectivity unit 1330 may perform wired or wireless communication with an external device. For example, the connectivity unit 1330 may perform Ethernet communication, near field communication (NFC), radio frequency identification (RFID) communication, mobile telecommunication, memory card communication, universal serial bus (USB) communication, etc. In some embodiments, the connectivity unit 1330 may include a baseband chipset that supports communications, such as global system for mobile communications (GSM), general packet radio service (GPRS), wideband code division multiple access (WCDMA), high speed downlink/uplink packet access (HSxPA), etc.

In some embodiments, the mobile system 1000 may further include a camera image processor (CIS), and/or a storage device, such as a memory card, a solid state drive (SSD), a hard disk drive (HDD), a CD-ROM, etc.

In some embodiments, the mobile system 1000 and/or components of the mobile system 1000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi-chip package (MCP), wafer-level fabricated package (WFP), or wafer-level processed stack package (WSP).

If a reader receiver according to some embodiments of the present inventive concept is implemented, a design size and a power consumption of the communication system including the reader receiver may be reduced.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope is to be determined by the broadest permissible interpretation of the following claims and their equivalents, and shall not be restricted or limited by the foregoing detailed description.

What is claimed is:

1. A reader receiver, comprising:
    a sample clock providing circuit configured to generate a plurality of delayed clock signals by controlling a phase of an initial clock signal, configured to select one of the plurality of delayed clock signals as a sample clock signal based on an input signal and further configured to provide an I phase sample clock signal and a Q phase sample clock signal based on the sample clock signal;
    a mixer configured to convert the input signal into base band signals in synchronization with the I phase sample clock signal and the Q phase sample clock signal, respectively; and
    a base band signal processing circuit configured to filter and amplify the base band signals; wherein the sample clock providing circuit includes:
    a reference clock generator configured to generate a reference clock signal based on the input signal;
    an initial clock generator configured to generate the initial clock signal;
    a clock delay circuit configured to generate the plurality of delayed clock signals by delaying the initial clock signal;
    a phase comparator configured to provide a selection signal by comparing a respective phase of each of the plurality of delayed clock signals against a phase of the reference clock signal; and
    a selector configured to output the I phase sample clock signal and the Q phase sample clock signal by selecting the one of the plurality of delayed clock signals as the sample clock signal based on the selection signal.

2. The reader receiver of claim 1, wherein the clock delay circuit includes a plurality of delay cells configured to provide the plurality of delayed clock signals by controlling the phase of the initial clock signal, and
    wherein an interval of controlling a phase of the sample clock signal decreases as a number of the plurality of delayed clock signals increases.

3. The reader receiver of claim 2, wherein the one of the plurality of delayed clock signals selected as the sample clock signal is most closely aligned in phase to the reference clock signal.

4. The reader receiver of claim 2, wherein the sample clock providing circuit is configured to control the phase of the sample clock signal to reduce a phase noise of the sample clock signal.

5. The reader receiver of claim 1, wherein the phase comparator includes:
    a phase comparing circuit configured to output phase difference signals by comparing the respective phase of each of the plurality of delayed clock signals against the phase of the reference clock signal; and
    a ranking generator configured to determine phase difference rankings of the phase difference signals and configured to provide the selection signal based on the phase difference rankings.

6. The reader receiver of claim 5, wherein phase differences between the reference clock signal and each of the plurality of delayed clock signals are represented as pulse widths corresponding to the respective phase differences.

7. The reader receiver of claim 6, wherein the phase comparing circuit is configured to output the phase difference signals by converting the pulse widths to amplitudes of voltages or currents.

8. The reader receiver of claim 7, wherein each of the phase difference rankings is digital code provided based on the amplitudes of the voltages or the currents.

9. The reader receiver of the claim 8, wherein the ranking generator is configured to arrange the digital codes in a descending order or an ascending order.

10. The reader receiver of the claim 9, wherein values of the phase difference signals decrease as values of the digital codes increase when the digital codes are arranged in the descending order, and a first digital code of the arranged digital codes is provided as the selection signal.

11. The reader receiver of the claim 9, wherein values of the phase difference signals increase as values of the digital codes increase when the digital codes are arranged in the ascending order, and a last digital code of the arranged digital codes is provided as the selection signal.

12. The reader receiver of claim 1, wherein the one of the plurality of delayed clock signals selected as the sample clock signal is most closely aligned in phase to the reference clock signal.

13. A reader transceiver comprising:
    a reader transmitter configured to transmit an output signal in synchronization with a transmission clock signal;

a reader receiver configured to process an input signal; and a phase trace circuit configured to perform a tracing process for an I phase sample clock signal and a Q phase sample clock signal between an end of a reader transmission interval and a start of a reader reception interval, wherein the reader receiver includes:

a sample clock providing circuit configured to generate a plurality of delayed clock signals by controlling a phase of an initial clock signal, configured to select one of the plurality of delayed clock signals as a sample clock signal based on an input signal and further configured to provide the I phase sample clock signal and the Q phase sample clock signal based on the sample clock signal;

a mixer configured to convert the input signal into base band signals in synchronization with the I phase sample clock signal and the Q phase sample clock signal, respectively; and a base band signal processing circuit configured to filter and amplify the base band signals.

14. The reader transceiver of claim 13, wherein the I phase sample clock signal and the Q phase sample clock signal are provided by controlling a phase of the transmission clock signal.

15. The reader transceiver of claim 13, wherein the sample clock providing circuit comprises a reference clock generator configured to generate a reference clock signal based on the input signal, and wherein the one of the plurality of delayed clock signals selected as the sample clock signal is most closely aligned in phase to the reference clock signal.

16. The reader transceiver of claim 15, wherein the sample clock providing circuit comprises a clock delay circuit, and the clock delay circuit comprises a plurality of delay cells configured to provide the plurality of delayed clock signals by controlling the phase of the initial clock signal.

* * * * *